United States Patent
Boualleg et al.

(10) Patent No.: US 10,858,262 B2
(45) Date of Patent: Dec. 8, 2020

(54) GEL WITH HIGH DISPERSIBILITY AND METHOD FOR PREPARING SAME

(71) Applicant: IFP Energies nouvelles, Rueil-Malmaison (FR)

(72) Inventors: Malika Boualleg, Villeurbanne (FR); Celine Bouvry, Rueil-Malmaison (FR); Patrick Euzen, Paris (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/045,118

(22) Filed: Jul. 25, 2018

(65) Prior Publication Data

US 2018/0334391 A1 Nov. 22, 2018

Related U.S. Application Data

(62) Division of application No. 15/318,582, filed as application No. PCT/EP2015/062829 on Jun. 9, 2015, now abandoned.

(30) Foreign Application Priority Data

Jun. 13, 2014 (FR) ..................... 14 55421

(51) Int. Cl.
| | | |
|---|---|---|
| *C01F 7/34* | (2006.01) | |
| *C01F 7/44* | (2006.01) | |
| *C01F 7/14* | (2006.01) | |
| *B01J 13/00* | (2006.01) | |

(52) U.S. Cl.
CPC .............. *C01F 7/34* (2013.01); *B01J 13/0056* (2013.01); *C01F 7/141* (2013.01); *C01F 7/441* (2013.01); *C01P 2002/60* (2013.01); *C01P 2006/22* (2013.01); *C01P 2006/80* (2013.01)

(58) Field of Classification Search
CPC ... C01F 7/34; C01F 7/141; C01F 7/441; B01J 13/0056
See application file for complete search history.

(56) References Cited

U.S. PATENT DOCUMENTS

| 6,713,428 B1 | 3/2004 | Le Goff et al. |
| 7,790,652 B2 | 9/2010 | Ackerman et al. |
| 2005/0101480 A1 | 5/2005 | Ackerman et al. |

FOREIGN PATENT DOCUMENTS

| EP | 0147167 A2 | 7/1985 |
| GB | 2123804 A | 2/1984 |

OTHER PUBLICATIONS

International Search Report corresponding to PCT/EP2015/062829—date of completion Aug. 18, 2015; dated Aug. 26, 2015.

*Primary Examiner* — James A Fiorito
(74) *Attorney, Agent, or Firm* — Millen White Zelano and Branigan, PC; Csaba Henter

(57) ABSTRACT

A novel alumina gel is described having an elevated dispersibility index, and in particular a dispersibility index greater than 70%, a crystallite size between 1 and 35 nm, and a sulphur content between 0.001% and 2% by weight, and a sodium content between 0.001% and 2% by weight, the weight percentages being expressed in relation to the total mass of alumina gel.

The present invention also discloses the method for preparing said gel comprising at least one step of precipitating at least one aluminium salt, at least one step of heating the suspension obtained and a final heat treatment step for forming the alumina gel.

18 Claims, No Drawings

GEL WITH HIGH DISPERSIBILITY AND METHOD FOR PREPARING SAME

TECHNICAL FIELD

The present invention relates to the preparation of alumina gels. In particular, the present invention relates to a novel alumina gel exhibiting high dispersibility and the method of preparation thereof by precipitation.

PRIOR ART

Several operating protocols known in the prior art lead to dispersible alumina gels. Several patents describe in particular a preparation process referred to as "sol-gel".

U.S. Pat. No. 4,676,928 describes a process for producing a water dispersible alumina comprising a step of forming an aqueous alumina slurry, an acidification step for producing an acidified slurry having a pH between 5 and 9, an ageing step at an elevated temperature above 70° C. for a sufficient period of time to convert the alumina to a colloidal gel, followed by a step of drying said colloidal gel thus obtained.

U.S. Pat. No. 5,178,849 also describes a process for producing an alpha alumina comprising a step of dispersing an aluminium hydrate having a dispersibility below 70%, a step of acidifying the slurry obtained to a pH below 3.5 to at least partially dissolve the aluminium hydrate, a step of hydrothermally treating the acidified slurry obtained at a temperature between 150 and 200° C., at a pressure between 5 and 20 atm for a duration between 0.15 and 4 hours to obtain a colloidal boehmite having a dispersibility greater than 90%.

The preparation of alumina gel by precipitation is also well known in the prior art.

In particular, U.S. Pat. No. 7,790,652 describes the preparation by precipitation of an alumina support material having a specific pore distribution, capable of being used as a catalyst support in a process of hydroconversion of heavy hydrocarbon feedstock.

The alumina support material is prepared according to a method comprising a first step of forming an alumina slurry by mixing, in a controlled fashion, a first alkaline aqueous solution and a first acidic aqueous solution, at least one of said acidic and basic solutions, or both, comprising an aluminium compound. The acidic and basic solutions are mixed in proportions such that the pH of the resulting slurry is between 8 and 11. The acidic and basic solutions are also mixed in quantities making it possible to obtain a slurry containing the desired quantity of alumina, in particular, the first step makes it possible to obtain 25 to 35% by weight of alumina relative to the total quantity of alumina formed at the end of the two precipitation steps. The first step takes place at a temperature between 20 and 40° C. When the desired quantity of alumina is formed, the temperature of the suspension is increased to a temperature between 45 and 70° C., then the heated suspension is subjected to a second precipitation step by contacting said suspension with a second alkaline aqueous solution and a second acidic aqueous solution, at least one of the two solutions or both comprising an aluminium compound. Similarly, the pH is adjusted to between 8 and 10.5 by the proportions of the acidic and basic solutions added and the remaining quantity of alumina to be formed in the second step is contributed by the quantities of the second acidic and basic solutions added. The second step takes place at a temperature between 20 and 40° C. The alumina gel thus formed comprises at least 95% boehmite. The dispersibility of the alumina gel thus obtained is not mentioned. The alumina gel is then filtered, washed and optionally dried by methods known to the person skilled in the art, without a preliminary maturing step, to produce an alumina powder which is then formed by methods known to the person skilled in the art, then calcined to produce the final alumina support.

The first precipitation step of the preparation method of U.S. Pat. No. 7,790,652 is limited to a low production of alumina, comprised between 25 and 35% by weight, as a higher alumina production at the end of the first step does not permit optimal filtration of the gel obtained. Furthermore, increasing the production of alumina in the first step of U.S. Pat. No. 7,790,652 would not permit forming of the gel thus obtained.

The present invention proposes to overcome the drawbacks of the preparation method according to U.S. Pat. No. 7,790,652.

The applicant has thus discovered a novel method for preparing an alumina gel by precipitation making it possible to obtain said alumina gel at the end of a single precipitation step, taking place at low temperature, the second precipitation step being optional. In particular the novel method of preparing alumina gel according to the invention makes it possible to obtain at least 40% by weight of alumina in $Al_2O_3$ equivalent relative to the total quantity of alumina formed at the end of said gel preparation method, in the first precipitation step, with the possibility that the quantity of alumina formed at the end of the first precipitation step may even reach 100%, a second precipitation step not being necessary in this case. Furthermore, the new preparation method according to the invention is characterised by the presence of a final heat treatment step and in particular a final maturing step making it possible to obtain an alumina gel having improved filterability, providing higher productivity of the method according to the invention, and making it easier to scale up the process to the industrial level. Said method according to the invention also makes it possible to obtain an alumina gel having a better dispersibility index compared with alumina gels of the prior art, thereby facilitating the forming thereof by the techniques known to the person skilled in the art.

One object of the present invention is therefore to provide an alumina gel having an elevated dispersibility index, and in particular a dispersibility index greater than 70%, and capable of reaching 100%.

A further object of the present invention is to provide a novel method for preparing said alumina gel by precipitation, in an aqueous reaction medium, of at least one basic precursor and at least one acidic precursor, at least one of the basic or acidic precursors, or both, comprising aluminium, in relative proportions and in specific quantities defining the operating conditions of said step and making it possible to obtain an alumina gel having an elevated dispersibility index, and in particular a dispersibility index greater than 70%, preferably between 70 and 100%, preferably between 80 and 100%, more preferably between 85 and 100%, and even more preferably between 90 and 100%.

SUMMARY AND INTEREST OF THE INVENTION

The object of the present invention is an alumina gel having an elevated dispersibility index, and in particular a dispersibility index greater than 70%, a crystallite size between 1 to 35 nm, and a sulphur content between 0.001% and 2% by weight, and a sodium content between 0.001% and 2% by weight, the weight percentages being expressed in relation to the total mass of alumina gel.

One advantage of the invention is that it provides a novel alumina gel having a very high dispersibility compared with alumina gels of the prior art.

An alumina gel characterised by an elevated dispersibility index will be more readily formed by all of the forming techniques known to the person skilled in the art, such as for example by mixing-extrusion, pelletizing or the oil drop technique, than a gel having a low dispersibility index.

A further object of the present invention is a method for preparing said alumina gel, said method comprising at least the following steps:

a) at least one step of precipitating alumina, in an aqueous reaction medium, of at least one basic precursor selected from sodium aluminate, potassium aluminate, ammonia, sodium hydroxide and potassium hydroxide and of at least one acidic precursor selected from aluminium sulphate, aluminium chloride, aluminium nitrate, sulphuric acid, hydrochloric acid, and nitric acid, in which at least one of the basic or acidic precursors includes aluminium, the relative feed rate of the acidic and basic precursors is chosen so as to obtain a pH of the reaction medium between 8.5 and 10.5 and the feed rate of the acidic and basic precursor(s) containing aluminium is adjusted so as to obtain a progression rate of the first step between 40 and 100%, the progression rate being defined as the proportion of alumina formed in $Al_2O_3$ equivalent during said first precipitation step relative to the total quantity of alumina formed at the end of the precipitation step(s), said step a) taking place at a temperature between 10 and 50° C., and for a duration of between 2 minutes and 30 minutes, b) a step of heat treating the suspension obtained at the end of step a), at a temperature between 50 and 200° C. for a duration of between 30 minutes and 5 hours, c) a step of filtering the suspension obtained at the end of heat treatment step b), followed by at least one step of washing the gel obtained.

One advantage of the invention is that it provides a novel method of preparing an alumina gel by precipitation making it possible to obtain, in the first precipitation step, at least 40% by weight of alumina in $Al_2O_3$ equivalent relative to the total quantity of alumina formed at the end of the precipitation step(s), with the possibility that the quantity of alumina formed at the end of the first precipitation step may even reach 100%, a second precipitation step not being necessary in this case. Furthermore, the method according to the invention characterised by the combination of this alumina precipitation step producing an elevated quantity of alumina and a final step of heat treating the suspension obtained makes it possible to obtain an alumina gel having improved filterability, providing higher productivity of the method according to the invention, and making it easier to scale up the process to the industrial level.

Another advantage of the invention is that it provides a novel method of preparing an alumina gel by precipitation capable of comprising a single precipitation step and which is relatively inexpensive compared with conventional alumina preparation processes of the prior art such as for example preparation processes of the sol-gel type.

A further advantage of the invention is that it provides a novel method of preparation by precipitation of an alumina gel having an elevated dispersibility index compared with gels of the prior art.

DESCRIPTION OF THE INVENTION

The object of the present invention is an alumina gel having a dispersibility index greater than 70%, a crystallite size of between 1 and 35 nm, a sulphur content measured by X-ray fluorescence of between 0.001% and 2% by weight, and a sodium content measured by ICP or inductively coupled plasma spectrometry of between 0.001% and 2% by weight, the weight percentages being expressed in relation to the total mass of alumina gel.

Throughout the remainder of the text, dispersibility index is defined as the percentage by weight of peptised alumina gel that can be dispersed by centrifugation in a polypropylene tube at 3600 G for 10 minutes.

Dispersibility is measured by dispersing 10% of boehmite or alumina gel in a suspension of water also containing 10% nitric acid relative to the mass of boehmite. The suspension is then centrifuged at 3600G rpm for 10 minutes. The collected sediments are dried at 100° C. overnight then weighed.

The dispersibility index, denoted DI, is obtained by the following calculation: DI (%)=100%-mass of dried sediments (%).

Preferably, the alumina gel according to the invention has a dispersibility index between 70 and 100%, preferably between 80 and 100%, more preferably between 85 and 100%, and even more preferably between 90 and 100%.

Preferably, the alumina gel according to the invention has a crystallite size between 2 and 35 nm.

In particular, the alumina gel or boehmite in powder form according to the invention is composed of crystallites of which the size, obtained by the Scherrer formula in X-ray diffraction in the crystallographic directions (020) and (120), is respectively between 2 and 20 nm and between 2 and 35 nm.

Preferably, the alumina gel according to the invention has a crystallite size in the crystallographic direction (020) between 2 and 15 nm and a crystallite size in the crystallographic direction (120) between 2 and 35 nm.

X-ray diffraction was carried out on the alumina gels or boehmites using the conventional powder method using a diffractometer.

The Scherrer formula is a formula used in X-ray diffraction on powders or polycrystalline samples which relates the mid-height width of the diffraction peaks to the size of the crystallites. It is described in detail in the reference: Appl. Cryst. (1978). 11, 102-113 Scherrer after sixty years: A survey and some new results in the determination of crystallite size, J. I. Langford and A. J. C. Wilson.

According to the invention, the alumina gel prepared in accordance with the invention has an impurities content, and in particular a sulphur content measured by X-ray fluorescence of between 0.001% and 2% by weight, and a sodium content measured by ICP or inductively coupled plasma spectrometry of between 0.001% and 2% by weight, the weight percentages being expressed in relation to the total mass of alumina gel.

Preferably, the alumina gel prepared according to the invention includes a sulphur content between 0.001% and 1% by weight, preferably between 0.001 and 0.40% by weight, more preferably between 0.003 and 0.33% by weight, and even more preferably between 0.005 and 0.25% by weight.

Preferably, the alumina gel prepared according to the invention includes a sodium content between 0.001% and 1% by weight, preferably between 0.001 and 0.15% by weight, more preferably between 0.0015 and 0.10% by weight, and even more preferably between 0.002 and 0.040% by weight.

Preparation Method

A further object of the present invention is a method for preparing said alumina gel.

According to the invention, said preparation method comprises at least one step a) of precipitating alumina, in an aqueous reaction medium, of at least one basic precursor selected from sodium aluminate, potassium aluminate, ammonia, sodium hydroxide and potassium hydroxide and of at least one acidic precursor selected from aluminium sulphate, aluminium chloride, aluminium nitrate, sulphuric acid, hydrochloric acid, and nitric acid, in which at least one of the basic or acidic precursors includes aluminium, the relative feed rate of the acidic and basic precursors is chosen so as to obtain a pH of the reaction medium between 8.5 and 10.5 and the feed rate of the acidic and basic precursor(s) containing aluminium is adjusted so as to obtain a progression rate of the first step between 40 and 100%, the progression rate being defined as the proportion of alumina formed in $Al_2O_3$ equivalent during said first precipitation step a) relative to the total quantity of alumina formed at the end of the precipitation step(s) and more generally at the end of the preparation method according to the invention, said step a) taking place at a temperature between 10 and 50° C., and for a duration between 2 minutes and 30 minutes.

In a general manner, the "progression rate" of the $n^{th}$ precipitation step is understood to mean the percentage of alumina formed in $Al_2O_3$ equivalent at said $n^{th}$ step relative to the total quantity of alumina formed at the end of all the precipitation steps and more generally at the end of the steps of preparing the alumina gel.

In the case where the progression rate of said precipitation step a) is 100%, said precipitation step a) generally makes it possible to obtain an alumina suspension having an $Al_2O_3$ concentration of between 20 and 100 g/l, for preference between 20 and 80 g/l, and preferably between 20 and 50 g/l.

Precipitation Step a)

Mixing of at least one basic precursor and at least one acidic precursor in the aqueous reaction medium requires either that at least the basic precursor or the acidic precursor includes aluminium, or that both the basic and acidic precursors include aluminium.

Basic precursors that include aluminium are sodium aluminate and potassium aluminate.

The preferred basic precursor is sodium aluminate.

Acidic precursors that include aluminium are aluminium sulphate, aluminium chloride and aluminium nitrate. The preferred acidic precursor is aluminium sulphate.

Preferably, the basic or acidic precursor(s) are added at said first precipitation step a) in aqueous solutions.

Preferably, the aqueous reaction medium is water.

Preferably, said step a) takes place while stirring.

Preferably, said step a) is performed in the absence of organic additive.

The acidic and basic precursors, whether or not they contain aluminium, are mixed, preferably in solution, in the aqueous reaction medium, in proportions such that the pH of the resulting suspension is between 8.5 and 10.5.

According to the invention, it is the relative feed rate of the acidic and basic precursors, whether or not they contain aluminium, that is chosen so as to obtain a pH of the reaction medium between 8.5 and 10.5.

In the preferred case where the basic and acidic precursors are respectively sodium aluminate and aluminium sulphate, the mass ratio of said basic precursor to said acidic precursor is advantageously between 1.6 and 2.05.

For the other basic and acidic precursors, whether or not they contain aluminium, the base/acid mass ratios are established by a curve of neutralisation of the base by the acid.

Such a curve is readily obtained by the person skilled in the art.

Preferably, said precipitation step a) is performed at a pH between 8.5 and 10 and more preferably between 8.7 and 9.9.

The acidic and basic precursors are also mixed in quantities making it possible to obtain a suspension containing the desired quantity of alumina, in relation to the final alumina concentration to be achieved. In particular, said step a) makes it possible to obtain 40 to 100% by weight of alumina in $Al_2O_3$ equivalent relative to the total quantity of alumina formed at the end of the precipitation step(s). According to the invention, it is the feed rate of the acidic and basic precursor(s) that is adjusted so as to obtain a progression rate of the first step of between 40 and 100%.

For preference, the progression rate of said precipitation step a) is between 40 and 99%, preferably between 45 and 90%, and more preferably between 50 to 85%. In the case where the progression rate obtained at the end of precipitation step a) is below 100%, a second precipitation step is necessary so as to increase the quantity of alumina formed. In this case, the progression rate is defined as the proportion of alumina formed in $Al_2O_3$ equivalent at said precipitation step a) relative to the total quantity of alumina formed at the end of the two precipitation steps of the preparation method according to the invention.

Thus, depending on the target alumina concentration at the end of the precipitation step(s), preferably comprised between 20 and 100 g/l, the quantities of aluminium to be contributed by the acidic and/or basic precursors are calculated and the feed rate of the precursors is adjusted in relation to the aluminium concentration of said added precursors, to the quantity of water added to the reaction medium, and to the required progression rate for the precipitation step(s).

The feed rate of the acidic and/or basic precursor(s) containing aluminium depends on the size of the reaction vessel used and thus on the quantity of water added to the reaction medium.

For preference, said precipitation step a) is performed at a temperature between 10 and 45° C., preferably between 15 and 45° C., more preferably between 20 and 45° C., and even more preferably between 20 and 40° C.

It is important that said precipitation step a) takes place at low temperature. In the case where said preparation method according to the invention comprises two precipitation steps, precipitation step a) is advantageously performed at a temperature below the temperature of the second precipitation step.

For preference, said precipitation step a) is performed for a duration between 5 and 20 minutes, and preferably between 5 and 15 minutes.

Heat Treatment Step b)

According to the invention, said preparation method comprises a step b) of heat treating the suspension obtained at the end of precipitation step a), at a temperature between 60 and 200° C. for a duration of between 30 minutes and 5 hours, in order to obtain the alumina gel.

Preferably, said heat treatment step b) is a maturation step.

For preference, said heat treatment step b) is performed at a temperature between 65 and 150° C., preferably between 65 and 130° C., more preferably between 70 and 110° C., and even more preferably between 70 and 95° C.

For preference, said heat treatment step b) is performed for a duration of between 40 minutes and 5 hours, preferably between 40 minutes and 3 hours, and more preferably between 45 minutes and 2 hours.

Optional Second Precipitation Step

According to a preferred embodiment, in the case where the progression rate obtained at the end of precipitation step a) is below 100%, said preparation method preferably comprises a second precipitation step a') after the first precipitation step.

Said second precipitation step makes it possible to increase the proportion of alumina produced.

Said second precipitation step a') is advantageously put into effect between said first precipitation step a) and the heat treatment step b).

In the case where a second precipitation step is put into effect, a step of heating the suspension obtained at the end of precipitation step a) is advantageously implemented between the two precipitation steps a) and a').

For preference, said step of heating the suspension obtained at the end of step a), put into effect between said step a) and the second precipitation step a'), takes place at a temperature between 20 and 90° C., preferably between 30 and 80° C., more preferably between 30 and 70° C., and even more preferably between 40 and 65° C.

For preference, said heating step is performed for a duration of between 7 and 45 minutes, and preferably between 7 and 35 minutes.

Said heating step is advantageously implemented according to all heating methods known to the person skilled in the art.

According to the preferred embodiment, said preparation method comprises a second step of precipitating the suspension obtained at the end of the heating step, said second step being carried out by adding to said suspension at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid, and nitric acid, in which at least one of the basic or acidic precursors includes aluminium, the relative feed rate of the acidic and basic precursors is chosen so as to obtain a pH of the reaction medium between 8.5 and 10.5 and the feed rate of the acidic and basic precursor(s) containing aluminium is adjusted so as to obtain a progression rate of the second step between 0 and 60%, the progression rate being defined as the proportion of alumina formed in $Al_2O_3$ equivalent during said second precipitation step relative to the total quantity of alumina formed at the end of the two precipitation steps and preferably at the end of step a') of the preparation method according to the invention, said step taking place at a temperature between 40 and 90° C., and for a duration between 2 minutes and 50 minutes.

As in the first precipitation step a), the addition of at least one basic precursor and at least one acidic precursor to the heated suspension requires either that at least the basic precursor or the acidic precursor includes aluminium, or that both the basic and acidic precursors include aluminium.

Basic precursors that include aluminium are sodium aluminate and potassium aluminate. The preferred basic precursor is sodium aluminate.

Acidic precursors that include aluminium are aluminium sulphate, aluminium chloride and aluminium nitrate. The preferred acidic precursor is aluminium sulphate.

Preferably, said second precipitation step takes place while stirring.

Preferably, said second step is performed in the absence of organic additive.

The acidic and basic precursors, whether or not they contain aluminium, are mixed, preferably in solution, in the aqueous reaction medium, in proportions such that the pH of the resulting suspension is between 8.5 and 10.5.

As at precipitation step a), it is the relative feed rate of the acidic and basic precursors, whether or not they contain aluminium, that is chosen so as to obtain a pH of the reaction medium between 8.5 and 10.5.

In the preferred case where the basic and acidic precursors are respectively sodium aluminate and aluminium sulphate, the mass ratio of said basic precursor to said acidic precursor is advantageously between 1.6 and 2.05.

For the other basic and acidic precursors, whether or not they contain aluminium, the base/acid mass ratios are established by a curve of neutralisation of the base by the acid. Such a curve is readily obtained by the person skilled in the art.

For preference, said second precipitation step is performed at a pH between 8.5 and 10 and preferably between 8.7 and 9.9.

The acidic and basic precursors are also mixed in quantities making it possible to obtain a suspension containing the desired quantity of alumina, in relation to the final alumina concentration to be achieved. In particular, said second precipitation step makes it possible to obtain 0 to 60% by weight of alumina in $Al_2O_3$ equivalent relative to the total quantity of alumina formed at the end of the two precipitation steps and preferably at the end of step a'). As in precipitation step a), it is the feed rate of the acidic and basic precursor(s) containing aluminium that is adjusted so as to obtain a progression rate of the second step between 0 and 60%, the progression rate being defined as the proportion of alumina formed in said second precipitation step relative to the total quantity of alumina formed at the end of the two precipitation steps of the method according to the invention and preferably at the end of step a').

For preference, the progression rate of said second precipitation step a) is between 1 and 60%, preferably between 10 and 55%, and more preferably between 15 to 55%.

Thus, depending on the target alumina concentration at the end of the precipitation step(s), preferably comprised between 20 and 100 g/l, the quantities of aluminium to be contributed by the acidic and/or basic precursors are calculated and the feed rate of the precursors is adjusted in relation to the aluminium concentration of said added precursors, to the quantity of water added to the reaction medium, and to the required progression rate for each of the precipitation steps.

As in precipitation step a), the feed rate of the acidic and/or basic precursor(s) containing aluminium depends of the size of the reaction vessel used and thus on the quantity of water added to the reaction medium.

By way of example, if a 3-litre reaction vessel is used and it is proposed to obtain 1 litre of alumina suspension with a final $Al_2O_3$ concentration of 50 g/l, the target progression rate is 50% in $Al_2O_3$ equivalent for the first precipitation step. Thus, 50% of the total alumina must be added at precipitation step a). The alumina precursors are sodium aluminate at a concentration of 155 g/l of $Al_2O_3$ and aluminium sulphate at a concentration of 102 g/l of $Al_2O_3$ The pH of precipitation of the first step is fixed at 9.5 and the second at 9. The quantity of water added to the reaction vessel is 622 ml.

For the first precipitation step a) taking place at 30° C. for 8 minutes, the feed rate of aluminium sulphate must be 10.5 ml/min and the feed rate of sodium aluminate is 13.2 ml/min. The mass ratio of sodium aluminate to aluminium sulphate is therefore 1.91.

For the second precipitation step, taking place at 70° C. for 30 minutes, the feed rate of aluminium sulphate must be 2.9 ml/min and the feed rate of sodium aluminate is 3.5 ml/min.

The mass ratio of sodium aluminate to aluminium sulphate is therefore 1.84.

For preference, said second precipitation step is performed at a temperature between 40 and 80° C., preferably between 45 and 70° C., and even more preferably between 50 and 70° C.

For preference, the second precipitation step is performed for a duration of between 5 and 45 minutes, and preferably between 7 and 40 minutes.

The second precipitation step generally makes it possible to obtain an alumina suspension having an $Al_2O_3$ concentration of between 20 and 100 g/l, for preference between 20 and 80 g/l, and preferably between 20 and 50 g/l.

In the case where said second precipitation step is put into effect, said preparation method also advantageously comprises a second step of heating the suspension obtained at the end of said second precipitation step at a temperature between 50 and 95° C. and preferably between 60 and 90° C.

For preference, said second heating step is performed for a duration of between 7 and 45 minutes.

Said second heating step is advantageously implemented according to all heating methods known to the person skilled in the art.

Said second heating step makes it possible to increase the temperature of the reaction medium before subjecting the suspension obtained to heat treatment step b).

Filtration Step c)

In accordance with the invention, the method of preparing alumina gel according to the invention comprises a step c) of filtering the suspension obtained at the end of heat treatment step b), followed by at least one step of washing the gel obtained. Said filtration step is advantageously implemented according to all methods known to the person skilled in the art.

The filterability of the suspension obtained at the end of precipitation step a) or of the two precipitation steps is improved by the presence of said final heat treatment step b) of the suspension obtained, said heat treatment step being conducive to the productivity of the method according to the invention, and to the scaling up of the process to the industrial level.

Said filtration step is advantageously followed by at least one step of washing with water and preferably by one to three washing steps, with a quantity of water equal to the quantity of precipitate filtered.

The preparation method according to the present invention comprises at least one alumina precipitation step making it possible to obtain at least 40% by weight of alumina relative to the total quantity of alumina formed in $Al_2O_3$ equivalent at the end of the process, and at least one final step of heat treatment of the suspension obtained, thus providing an alumina gel according to the invention having a dispersibility index greater than 70% and a crystallite size between 2 and 35 nm.

The present invention also relates to the alumina gel capable of being obtained by the preparation method according to the invention.

The invention is illustrated by the following examples which are in no way limitative thereof.

EXAMPLES

Example 1: (Comparative)

A commercial powder of an alumina gel Pural SB3 is prepared via a sol-gel route by hydrolysis-polycondensation of an aluminium alcoxide.

The characteristics of the Pural SB3 boehmite gel are summarised in Table 1.

TABLE 1

| Characteristics of Pural SB3. | |
|---|---|
| | Commercial alumina gel |
| Dispersibility index | 98 |
| Size (020) (nm) | 3.1 |
| Size (120) (nm) | 4.7 |
| Sodium Na (ppm) | <detection limit |
| Sulphur S (ppm) | <detection limit |

The sulphur content measured by the X-ray fluorescence method, and the sodium content measured by ICP or inductively coupled plasma spectrometry are below the detection limit of these measuring methods.

Example 2 (Comparative)

An alumina gel is synthesised by a preparation method not according to the invention in that the precipitation step is performed at high temperature, that is at a temperature of 60° C.

Stirring at 350 rpm is maintained throughout the synthesis.

The synthesis takes place in a 5-litre reaction vessel in 2 steps, a precipitation step and a step of maturation of the suspension obtained.

The target final alumina concentration is 50 g/l.

A step of precipitating aluminium sulphate $Al_2(SO_4)$ and sodium aluminate NaAlOO is performed at 60° C. and pH=10.2 for a duration of 20 minutes. The concentrations of the aluminium precursors used are as follows: $Al_2(SO_4)$=at 102 g/l in $Al_2O_3$ and NaAlOO at 155 g/l in $Al_2O_3$ A solution of aluminium sulphate $Al_2(SO_4)$ is added continuously for 30 minutes at a rate of 25.9 ml/min to a solution of sodium aluminate NaAlOO in a base/acid mass ratio=2.0 so as to adjust the pH to a value of 10.2. The entirety of the precursors is placed in contact at a temperature of 60° C.

A suspension containing an alumina precipitate is obtained.

The target final alumina concentration being 50 g/l, the feed rates of the precursors aluminium sulphate $Al_2(SO_4)$ and sodium aluminate NaAlOO containing aluminium introduced at the first precipitation step are respectively 25.9 ml/min and 34.1 ml/min.

These feed rates of acidic and basic precursors containing aluminium make it possible to obtain a progression rate of 100% at the end of the first precipitation step.

The suspension obtained is then subjected to a temperature increase from 60 to 90° C.

The suspension then undergoes a maturation step in which it is maintained at 90° C. for 60 minutes.

The suspension obtained is then filtered by passing water through a sintered disk Buchner funnel and the alumina gel obtained is washed 3 times with 3.5 litres of distilled water at 70° C. The filtering and washing time is 3 h.

The characteristics of the alumina gel thus obtained are summarised in Table 2.

TABLE 2

Characteristics of alumina obtained according to Example 2.

|  | Example 3 |
|---|---|
| Dispersibility index Ta (10% (%) | 0 |
| Size (020) (nm) | 2.9 |
| Size (120) (nm) | 3.4 |
| Sodium Na (%) | 0.0068 |
| Sulphur S (%) | 0.042 |
| Filtration time | 3 h |

Example 2 not according to the invention indicates the importance of working at low temperature during the precipitation step and in particular during the first precipitation step. Thus, a precipitation step performed at a temperature of 70° C., outside the ranges claimed, does not make it possible to obtain a dispersible gel. However, the dispersion of 10% of alumina gel thus obtained in a water suspension also containing 10% nitric acid relative to the mass of alumina gel, followed by centrifugation of the suspension at 3600G for 10 minutes, yields 100% sediments.

Example 3 (Comparative)

An alumina gel is synthesised by a preparation method not according to the invention in that the method of preparing the gel in Example 3 does not include a heat treatment step and in that the first precipitation step a) does not produce a quantity of alumina greater than 40% relative to the total quantity of alumina formed at the end of the second precipitation step. Example 3 is carried out according to the preparation method described in U.S. Pat. No. 7,790,652.

The synthesis is performed in a 7-litre reaction vessel with a final suspension of 5 litres in two precipitation steps. The quantity of water added to the reaction vessel is 3868 ml.

The target final alumina concentration is 30 g/l.

A first step of precipitating aluminium sulphate $Al_2(SO_4)$ and sodium aluminate NaAlOO is performed at 30° C. and pH=9.3 for a duration of 8 minutes. The concentrations of the aluminium precursors used are as follows: $Al_2(SO_4)$=at 102 g/l in $Al_2O_3$ and NaAlOO at 155 g/l in $Al_2O_3$. Stirring at 350 rpm is maintained throughout the synthesis.

A solution of aluminium sulphate $Al_2(SO_4)$ is added continuously for 8 minutes at a rate of 19.6 ml/min to a solution of sodium aluminate NaAlOO in a base/acid mass ratio=1.80 so as to adjust the pH to a value of 9.3. The temperature of the reaction medium is maintained at 30° C.

A suspension containing an alumina precipitate is obtained.

The target final alumina concentration being 30 g/l, the feed rates of the precursors aluminium sulphate $Al_2(SO_4)$ and sodium aluminate NaAlOO containing aluminium introduced at the first precipitation step are respectively 19.6 ml/min and 23.3 ml/min.

These feed rates of acidic and basic precursors containing aluminium make it possible to obtain a progression rate of 30% at the end of the first precipitation step.

The suspension obtained is then subjected to a temperature increase from 30 to 57° C.

A second step of co-precipitation of the suspension obtained is then performed by adding aluminium sulphate $Al_2(SO_4)$ at a concentration of 102 g/l in $Al_2O_3$ and sodium aluminate NaAlOO at a concentration of 155 g/l in $Al_2O_3$.

A solution of aluminium sulphate $Al_2(SO_4)$ is therefore added continuously to the heated suspension obtained at the end of the first precipitation step for 30 minutes at a rate of 12.8 ml/min to a solution of sodium aluminate NaAlOO in a base/acid mass ratio=1.68 so as to adjust the pH to a value of 8.7. The temperature of the reaction medium in the second step is maintained at 57° C.

A suspension containing an alumina precipitate is obtained.

The target final alumina concentration being 30 g/l, the feed rates of the precursors aluminium sulphate Al2(SO4) and sodium aluminate NaAlOO containing aluminium introduced at the second precipitation step are respectively 12.8 ml/min and 14.1 ml/min.

These feed rates of acidic and basic precursors containing aluminium make it possible to obtain a progression rate of 70% at the end of the second precipitation step.

The suspension thus obtained is not subjected to a maturation step.

The suspension obtained is then filtered by passing water through a sintered disk Buchner funnel and the alumina gel obtained is washed 3 times with 5 litres of distilled water at 70° C. The filtering and washing time is 4 h.

The characteristics of the alumina gel thus obtained are summarised in Table 3.

TABLE 3

Characteristics of alumina obtained according to Example 3.

|  | Example 3 |
|---|---|
| Dispersibility index Ta (10% (%) | 60 |
| Size (020) (nm) | 2.9 |
| Size (120) (nm) | 4.1 |
| Sodium Na (ppm) | 0.011 |
| Sulphur S (ppm) | 0.057 |
| Filtration time | 4 h |

Example 4 (According to the Invention)

An alumina gel is synthesised by a preparation method according to the invention in a 7-litre reaction vessel with a final suspension of 5 litres in 3 steps, two precipitation steps followed by a maturation step.

The target final alumina concentration is 45 g/l. The quantity of water added to the reaction vessel is 3267 ml. Stirring at 350 rpm is maintained throughout the synthesis.

A first step of co-precipitation in water of aluminium sulphate $Al_2(SO_4)$ and sodium aluminate NaAlOO is performed at 30° C. and pH=9.5 for a duration of 8 minutes. The concentrations of the aluminium precursors used are as follows: $Al_2(SO_4)$=at 102 g/l in $Al_2O_3$ and NaAlOO at 155 g/l in $Al_2O_3$ A solution of aluminium sulphate $Al_2(SO_4)$ is added continuously for 8 minutes at a rate of 69.6 ml/min to a solution of sodium aluminate NaAlOO at a rate of 84.5 ml/min in a base/acid mass ratio=1.84 so as to adjust the pH to a value of 9.5. The temperature of the reaction medium is maintained at 30° C.

A suspension containing an alumina precipitate is obtained.

The target final alumina concentration being 45 g/l, the feed rates of the precursors aluminium sulphate $Al_2(SO_4)$ and sodium aluminate NaAlOO containing aluminium introduced at the first precipitation step are respectively 69.6 ml/min and 84.5 ml/min.

These feed rates of acidic and basic precursors containing aluminium make it possible to obtain a progression rate of 72% at the end of the first precipitation step.

The suspension obtained is then subjected to a temperature increase from 30 to 68° C.

A second step of co-precipitation of the suspension obtained is then performed by adding aluminium sulphate $Al_2(SO_4)$ at a concentration of 102 g/l in $Al_2O_3$ and sodium aluminate NaAlOO at a concentration of 155 g/l in $Al_2O_3$. A solution of aluminium sulphate $Al_2(SO_4)$ is therefore added continuously to the heated suspension obtained at the end of the first precipitation step for 30 minutes at a rate of 7.2 ml/min to a solution of sodium aluminate NaAlOO in a base/acid mass ratio=1.86 so as to adjust the pH to a value of 9. The temperature of the reaction medium in the second step is maintained at 68° C.

A suspension containing an alumina precipitate is obtained.

The target final alumina concentration being 45 g/l, the feed rates of the precursors aluminium sulphate $Al_2(SO_4)$ and sodium aluminate NaAlOO containing aluminium introduced at the second precipitation step are respectively 7.2 ml/min and 8.8 ml/min.

These feed rates of acidic and basic precursors containing aluminium make it possible to obtain a progression rate of 28% at the end of the second precipitation step.

The suspension obtained is then subjected to a temperature increase from 68 to 90° C.

The suspension then undergoes a heat treatment step in which it is maintained at 90° C. for 60 minutes.

The suspension obtained is then filtered by passing water through a sintered disk Buchner funnel and the alumina gel obtained is washed 3 times with 5 litres of distilled water. The filtering and washing time is 3 h.

The characteristics of the alumina gel thus obtained are summarised in Table 4.

TABLE 4

Characteristics of alumina obtained according to Example 4.

|  | Example 3: |
| --- | --- |
| Dispersibility index Ta (10%) (%) | 100 |
| Size (020) (nm) | 2.8 |
| Size (120) (nm) | 3.5 |
| Sodium Na (%) | 0.074 |
| Sulphur S (%) | 0.0364 |
| Filtration time | 3 h |

A gel having a dispersibility index of 100% is thus obtained. Furthermore, the gel obtained by the method according to the invention characterised by the presence of a final heat treatment step makes it possible to obtain an alumina gel with good filterability, that is a filtration time compatible with scaling up of the process to the industrial level, thereby facilitating improved productivity of said process.

It will also be noted that the alumina gel obtained by the preparation method according to the invention is readily formable.

The preparation method according to the invention yielding a 100% dispersible gel is also less expensive than the conventional alumina preparation methods of the prior art such as for example the sol-gel type methods of preparing Pural SB3 in Example 1.

The invention claimed is:

1. A preparation method of an alumina gel having a dispersibility index greater than 70%, a crystallite size between 1 and 35 nm, and a sulphur content between 0.001% and 2% by weight, and a sodium content between 0.001% and 2% by weight, the weight percentages being expressed in relation to the total mass of alumina gel, said method comprising at least the following steps:
    a) at least one first alumina precipitation step, in an aqueous reaction medium, of at least one basic precursor selected from the group consisting of sodium aluminate, potassium aluminate, ammonia, sodium hydroxide and potassium hydroxide, and at least one acidic precursor selected from the group consisting of aluminum sulphate, aluminum chloride, aluminum nitrate, sulphuric acid, hydrochloric acid, and nitric acid, in which at least one of the basic or acidic precursor comprises aluminum, the relative flow rate of the acidic and basic precursors is chosen so as to obtain a pH of the reaction medium between 8.5 and 10.5, and the flow rate of the acidic and basic precursor or precursors containing aluminum is regulated so as to obtain a rate of progress of said first step between 40 and 100%, the rate of progress being defined as the proportion of alumina formed as $Al_2O_3$ equivalent during the first precipitation step with respect to the total amount of alumina formed at the end of the precipitation step or steps, the said first precipitation step being carried out at a temperature between 10 and 50° C. and for a period between 2 minutes and 30 minutes,
    b) a heat treatment step of the suspension obtained at the end of step a), at a temperature between 50 and 200° C. for a period between 50 minutes and 5 hours, and
    c) a step of the suspension obtained at the end of heat treatment step b), followed by at least one washing step of the obtained gel.

2. The preparation method according to claim 1, in which in step a) the acidic precursor is aluminum sulphate and the basic precursor is sodium aluminate, wherein the mass ratio of said basic precursor to said acidic precursor is between 1.6 and 2.05.

3. The preparation method according to claim 1, in which the progression rate of said precipitation step a) is between 45 and 90%.

4. The preparation method according to claim 1, in which the heat treatment of step b) is at a temperature of 95 to 150° C.

5. A preparation method of an alumina gel having a dispersibility index greater than 70%, a crystallite size between 1 and 35 nm, and a sulphur content between 0.001% and 2% by weight, and a sodium content between 0.001% and 2% by weight, the weight percentages being expressed in relation to the total mass of alumina gel, said method comprising at least the following steps:
    a) at least one first alumina precipitation step, in an aqueous reaction medium, of at least one basic precursor selected from the group consisting of sodium aluminate, potassium aluminate, ammonia, sodium hydroxide and potassium hydroxide, and at least one acidic precursor selected from the group consisting of aluminum sulphate, aluminum chloride, aluminum nitrate, sulphuric acid, hydrochloric acid, and nitric acid, in which at least one of the basic or acidic precursor comprises aluminum, the relative flow rate of the acidic and basic precursors is chosen so as to obtain a pH of the reaction medium between 8.5 and 10.5, and the flow rate of the acidic and basic precursor or precursors containing aluminum is regulated so as to obtain a rate of progress of said first step between 45 and 90%, the rate of progress being defined as the proportion of alumina formed as $Al_2O_3$ equivalent during the first precipitation step with respect to the total amount of alumina formed at the end of the precipitation step or steps, the said first precipitation step being carried out at a temperature between 20 and 40° C. and for a period between 2 minutes and 30 minutes, a heating step of the suspension obtained at the end of the step a), carried out between said step a) and a second precipitation step a'), is performed at a temperature between 20 and 90° C. for a period between 7 and 45 minutes, a') a second precipitation step of the suspension obtained at the end of the heating step, said second step being carried out by adding to the suspension at least one basic precursor selected from the group consisting of sodium aluminate, potassium aluminate, ammonia, sodium hydroxide and potassium hydroxide and at least one acidic precursor selected from the group consisting of aluminum sulphate, aluminum chloride, aluminum nitrate, sulphuric acid, hydrochloric acid, and nitric acid, in which at least one of the basic or acidic precursors contains aluminum, the relative flow rate of the acidic and basic precursors is chosen so as to obtain a pH of the reaction medium between 8.5 and 10.5 and the flow rate of the acidic and basic precursor or precursors containing aluminum is regulated so as to obtain a rate of progress of the second step between 10 and 55%, the rate of progress being defined as the proportion of alumina formed as $Al_2O_3$ equivalent during said second precipitation step with respect to the total amount of alumina formed at the end of the step a'), said step being carried out at a temperature between 40 and 90° C., and for a period between 2 minutes and 50 minutes, a second heating step of the suspension obtained at the end of the said second precipitation step at a temperature between 50 and 95° C., b) a heat treatment step of the suspension obtained at the end of step a'), at a temperature between 50 and 200° C. for a period between 50 minutes and 5 hours, c) a filtration step of the suspension obtained at the end of the heat treatment step b), followed by at least one washing step of the obtained gel, d) a drying step of the alumina gel obtained at the end of the step c) so as to obtain a powder, e) a moulding step of the powder obtained at the end of the step d) so as to obtain a crude material, and f) a heat treatment step of the crude material obtained at the end of the step e) at a temperature between 500 and 1000° C., in the presence or otherwise of a stream of air containing up to 60% by volume of water.

6. The preparation method according to claim 5, in which the basic precursor in step a) is sodium aluminate.

7. The preparation method according to claim 5, in which the acidic precursor in step a) is aluminum sulphate.

8. The preparation method according to claim 5, in which in step a) the mass ratio of said basic precursor to said acidic precursor is between 1.6 and 2.05.

9. The preparation method according to claim 5, in which the progression rate of said precipitation step a) is between 50 to 85%.

10. The Preparation method according to claim 5, in which said precipitation step a) takes place at a temperature of 30° C.

11. The preparation method according to claim 5, in which a step of heating the suspension obtained at the end of precipitation step a) is performed between the two precipitation steps a) and a'), said heating step taking place at a temperature between 40 and 65° C. and for a duration of between 7 and 35 minutes.

12. The preparation method according to claim 5, in which in step a') the mass ratio of said basic precursor to said acidic precursor is between 1.6 and 2.05, the basic and acidic precursors being respectively sodium aluminate and aluminium sulphate.

13. The preparation method according to claim 5, in which the second precipitation step a') takes place at a temperature between 45 and 70° C.

14. The preparation method according to claim 5, in which the progression rate of said precipitation step a) is between 72 to 85%.

15. The preparation method according to claim 5, in which the progression rate of said precipitation step a) is between 50 to 72%.

16. The preparation method according to claim 5, in which the progression rate of said precipitation step a) is 72%.

17. The preparation method according to claim 5, in which the heat treatment of step b) is at a temperature of 95 to 150° C.

18. The preparation method according to claim 5, in which the heat treatment of step b) is at a temperature of 70 to 110° C.

* * * * *